United States Patent [19]
Kushida et al.

[11] 3,936,334
[45] Feb. 3, 1976

[54] COLLAPSABLE TUBE

[75] Inventors: Hideo Kushida; Yoshio Hara; Toshie Tanaka; Takeshi Itakura; Shinsaku Nakazato, all of Tokyo, Japan

[73] Assignee: Yoshino Kogyosho Co., Ltd., Tokyo, Japan

[22] Filed: June 24, 1974

[21] Appl. No.: 482,370

Related U.S. Application Data

[63] Continuation-in-part of Ser. No. 314,920, Dec. 14, 1972, abandoned.

[30] Foreign Application Priority Data

Dec. 25, 1971 Japan.................................. 47-3152

[52] U.S. Cl..................... 156/69; 156/309; 222/94; 222/95; 222/107; 428/35
[51] Int. Cl.²......................................... B29C 27/14
[58] Field of Search .......... 156/69, 309; 222/94, 95, 222/107, 209; 428/35

[56] References Cited
UNITED STATES PATENTS

| | | | |
|---|---|---|---|
| 2,252,854 | 8/1941 | Hubner et al. | 156/69 |
| 2,682,974 | 7/1954 | Smith | 156/69 |
| 2,743,038 | 4/1956 | Ferries | 222/209 |
| 2,777,612 | 1/1957 | Bensen | 222/209 |
| 2,889,078 | 6/1959 | Thomas | 156/69 |
| 2,965,964 | 12/1960 | Loew | 222/103 |
| 3,223,289 | 12/1965 | Bouet | 222/209 |
| 3,347,419 | 10/1967 | Brandt et al. | 222/107 |
| 3,381,818 | 5/1968 | Cope et al. | 222/107 |
| 3,740,306 | 6/1973 | Kosbab et al. | 161/219 |

*Primary Examiner*—Edward G. Whitby

[57] ABSTRACT

A process for forming a collapsable tube having a flexible inner tube and a resilient outer tube. A shoulder member is formed having connecting surfaces. A flexible inner tube is joined to the shoulder member at a connecting surface. An outer tube encompassing the inner tube is joined to the shoulder member at a separate connecting surface so that the outer tube overlaps the joint between the inner tube and shoulder member. To resist permeation, the inner tube is formed by lap welding a laminated sheet of different natured materials and depositing a molten material along an edge of the sheet to seal it.

11 Claims, 13 Drawing Figures

U.S. Patent   February 3, 1976   3,936,334
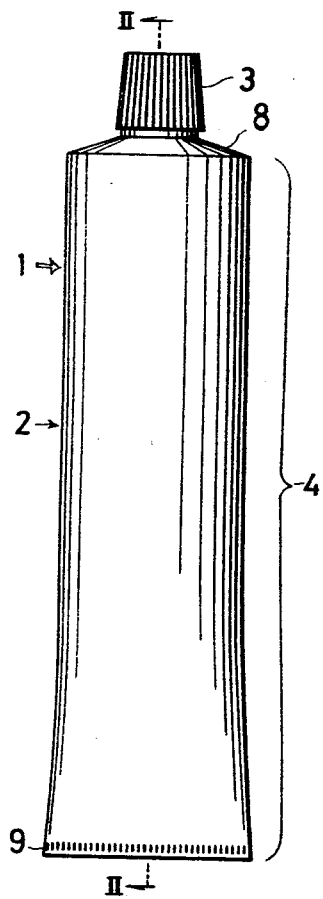
Fig. 1.
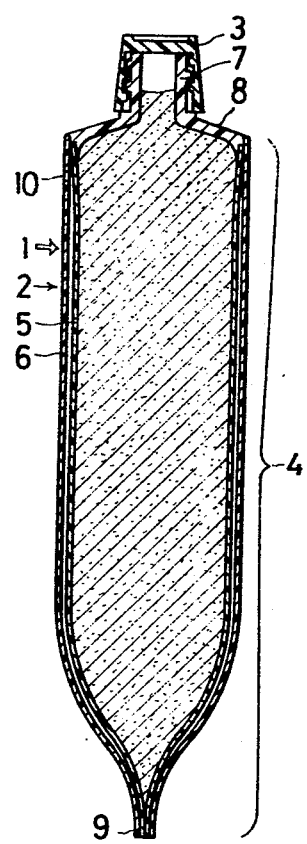
Fig. 2.A.
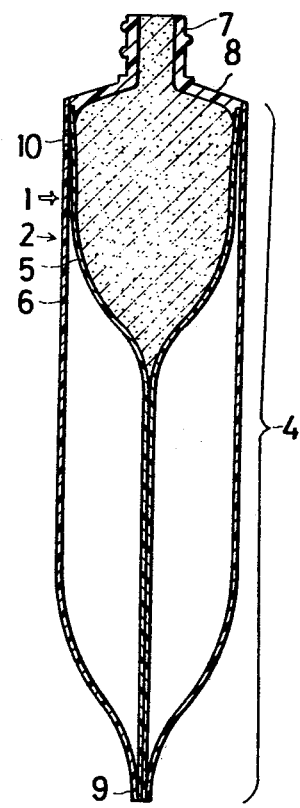
Fig. 2.B.
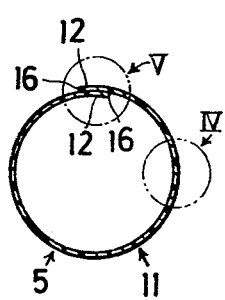
Fig. 3.
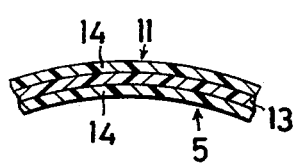
Fig. 4.A.
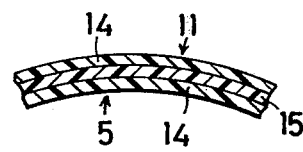
Fig. 4.B.

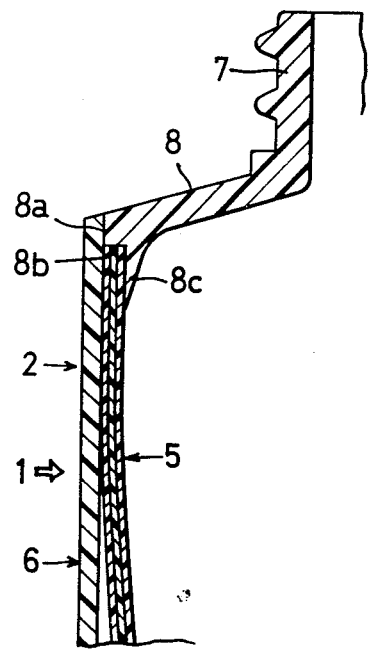
Fig. 2.C.
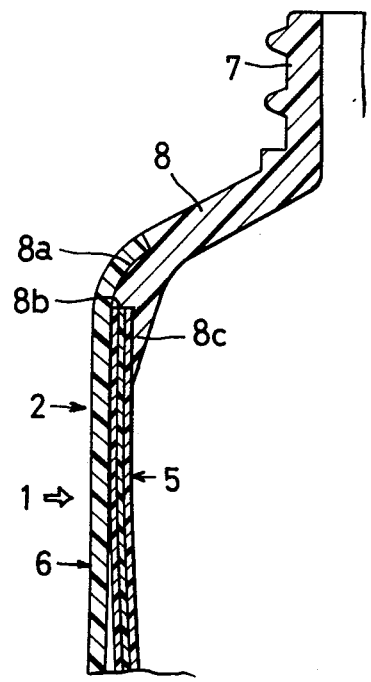
Fig. 2.D.
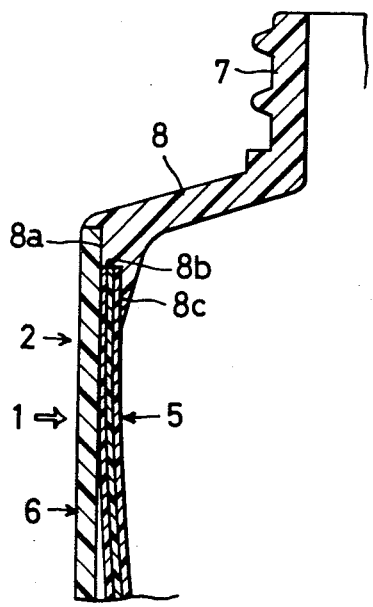
Fig. 2.E.

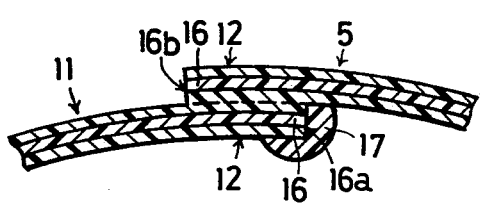
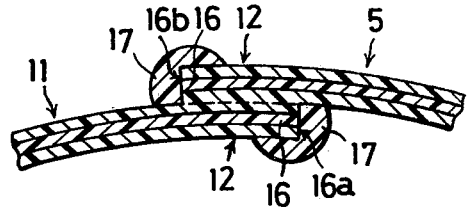
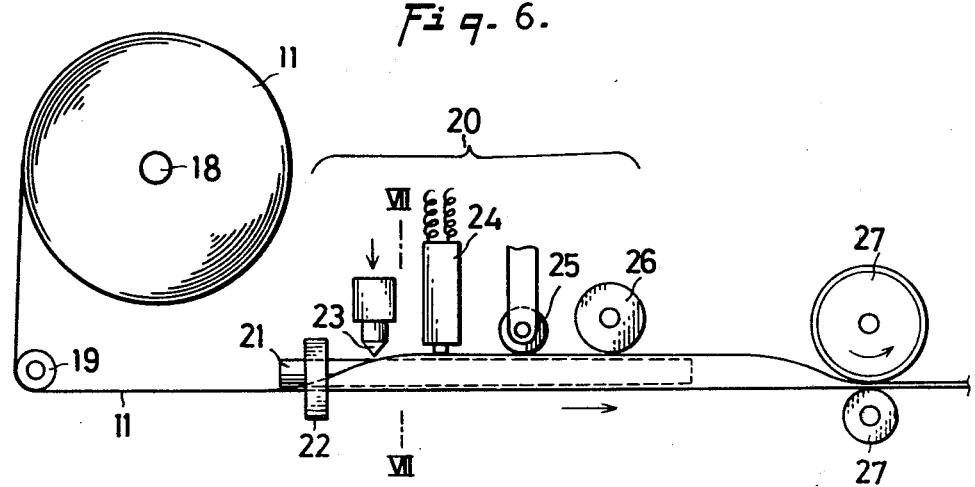
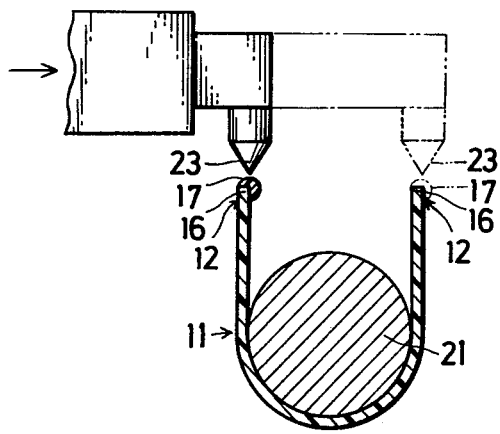

COLLAPSABLE TUBE

CROSS REFERENCE TO RELATED APPLICATIONS

This application is a Continuation-In-Part of our copending application, Ser. No. 314,920 filed Dec. 14, 1972 entitled "Collapsable Tube", now abandoned.

BACKGROUND OF THE INVENTION

1. Field of the Invention

This invention relates to collapsable tubes formed of synthetic resin materials.

2. Description of the Prior Art

To date, there are different collapsable tubes available for holding tooth paste, medicinal paste, paste food and the like. Most of these tubes, in the past, were formed of metal such as aluminium and such tubes had a disadvantage in that the body thereof was left ugly without returning to its original shape after having been compressed. Recently, collapsable tubes which are formed of synthetic resin materials have been in common use, which not only eliminate the aforementioned disadvantage of the prior known metal tubes but offer numerous advantages such as reduced cost and increased productivity. These tubes are constructed of synthetic resin materials that are sufficiently elastic to permit the body to return to its original shape after having been compressed. However, during the return process, air is allowed to enter into the body of the tube, tending to oxidize the substance contained therein as well as, when it is rapidly compressed, to cause a spattering of the substance due to the fact that it is forced to burst out with the air. Furthermore, because of the generally high permeability of synthetic resin to oxygen gas, water vapor and odor and their poor oil-resisting property, there is a tendency for the substance contained in such a tube to be adversely affected physically or chemically.

SUMMARY OF THE INVENTION

It is an object of the invention to provide an improved and economical method for fabricating a double-walled collapsable tube.

It is a further object of the invention to provide a method for fabricating a double-walled collapsable tube in which the outer tube is of seamless construction.

It is another object of the invention to provide a method for fabricating a double-walled collapsable tube having an inner tube which is highly resistant to oil and water and has extremely low permeability to oxygen, water and odor.

It is another object of the invention to provide a method for fabricating a double-walled collapsable tube in which the outer tube is resilient and returns to its original shape after having been compressed, whereas the inner tube is flexible and maintains its compressed shape thus preventing egress and ingress of atmosphere each time the tube is compressed and released.

According to one feature of the invention, a shoulder member is formed having a lower peripheral face, an annular connecting portion extending downwardly from the inner edge of the face, and a circumferential edge adjacent to and above the peripheral face. A flexible inner tube is joined to the shoulder member at the lower peripheral face and at the annular connecting portion. A resilient outer tube is joined to the shoulder member at the circumferential edge so as to encompass the inner tube and overlap the joint between the inner tube and the shoulder member.

According to another feature of the invention, the outer tube is a seamless tube and the inner tube is a laminated lap-welded tube formed of a plurality of films of different natured materials. A molten material is deposited on a longitudinal edge of the laminated tube to seal the edge of the laminations.

BRIEF DESCRIPTION OF THE INVENTION

These and other objects will be readily apparent from the following description of the invention when taken in conjunction with the accompanying drawings, in which:

FIG. 1 is an elevation showing a collapsable tube embodying the invention;

FIG. 2A is a longitudinal section taken along the line II—II of FIG. 1, showing the tube in a filled-up condition;

FIG. 2B is a view similar to FIG. 2A showing the tube after having been compressed, the cap being removed;

FIG. 2C is an enlarged fragmentary longitudinal section of the tube shown in FIG. 2A;

FIG. 2D is a view similar to FIG. 2C showing another embodiment of the tubes;

FIG. 2E is a view similar to FIG. 2C showing a further embodiment of the tube;

FIG. 3 is a cross section showing an inner tube of the present collapsable tube;

FIGS. 4A and 4B are enlarged fragmentary cross sections showing various sheets of laminated films of which the inner tube is constructed;

FIG. 5A is an enlarged fragmentary cross section showing the manner in which a molten, water-resistant material such as polyethylene is deposited on the inner end surface of the sheet;

FIG. 5B is a view similar to FIG. 5A showing the manner in which the molten, water-resistant material is deposited on each end surface of the sheet;

FIG. 6 is a schematic view showing a typical process of forming the inner tube; and FIG. 7 is an enlarged cross section taken along the line VII—VII of FIG. 6.

DESCRIPTION OF THE PREFERRED EMBODIMENTS

Referring now to FIG. 1, a collapsable tube 1, embodying the invention, includes a body 2 which comprises a tubular portion 4, a neck 7 (see FIG. 2) on which a cap 3 is removably mounted, and a shoulder member 8 provided between the tubular portion 4 and the neck 7. The tubular portion 4, as best seen in FIGS. 2A and 2B, has a double-walled structure which comprises an inner tube 5 and an outer tube 6. At their upper peripheral ends the inner and outer tubes 5 and 6 are sealed or welded to the lower peripheral end of the shoulder portion 8 which is preformed integrally with the neck 7. The lower ends of the inner and outer tubes 5 and 6 are sealed in the manner shown in FIGS. 2A and 2B, but may be fused to the periphery of a suitable bottom member (not shown).

The outer tube 6 is formed by extrusion-moulding a cylindrical tube and then cutting it into segments of a predetermined length. The outer tube 6 is formed of a material that is sufficiently elastic to permit the outer tube to return to its original shape after having been compressed, such as polyethylene, polypropylene and the like. As seen in FIGS. 2A and 2B, an opening 10 is provided in the outer tube 6 adjacent the shoulder 8, which opens to a space defined between the inner tube 5 and the outer tube 6 for purposes as will appear later.

As shown in FIGS. 2C–2E, the shoulder member 8 has a lower peripheral face 8b, an annular connecting portion 8c extending downwardly from the inner edge of the face, and a circumferential edge 8a adjacent to and above the peripheral face. The upper end of the inner tube 5 abuts the lower peripheral face 8b and is affixed to it. The inside surface of the inner tube 5 adjacent its upper end is affixed to the outer surface of the annular connecting portion 8c. Thus, the inner tube 5 is firmly attached to the shoulder 8 at the peripheral face 8b and at the annular connecting portion 8c.

The outer tube 6 is attached to shoulder 8 by affixing its upper inside surface to the circumferential edge 8a of the shoulder. The outer tube thereby overlaps and supports the joint between the inner tube 5 and the shoulder member 8. The joints may be sealed or welded in accordance with conventional techniques.

Referring to FIG. 3, the inner tube 5 is formed in a generally cylindrical shape by bending a sheet 11 of laminated films with the side ends 12 thereof overlapping each other. In order that the inner tube 5 may be flexible and yet it may not readily return to its original shape after having been compressed, the sheet 11 is so formed as to be sufficiently thin as a whole and, in one preferred embodiment (shown in FIG. 4A), comprise a polyvinyl alcohol film 13 and two polyethylene films 14 deposited coextensively on both surfaces thereof. In another embodiment (shown in FIG. 4B), an aluminium foil 15 is used in place of the polyvinyl alcohol film 13.

As is well known, a polyvinyl alcohol film has an extremely low permeability to oxygen gas and odor and, in addition, is highly resistant to oil. Since, however, the material is water-soluble, the polyvinyl alcohol film 13 is deposited on both surfaces thereof with the polyethylene films 14 which are highly resistant to water.

With the arrangement described and shown in FIGS. 1 through 4, since the outer tube 6 is sufficiently elastic to be able to return to its original shape but, in contrary, the inner tube 5 is not capable of returning to its original shape after having been compressed, then the tubular portion 4 changes from the condition shown in FIGS. 2A to 2B as the substance contained therein is squeezed out. The inner tube 5 remains in the condition shown in FIG. 2B until further application of pressures to the body 2 takes place. When pressures developed inside the body 2 are released, the outer tube 6 of itself returns to its original shape and simultaneously air enters into the space between the inner tube 5 and the outer tube 6 through the opening 10. Thus, as is best seen in FIG. 2B, the tube can always have an appearance which is not ugly, even after having been compressed. The fact that there is no air flowing into the inner tube 5 through an orifice in the neck 7 serves to prevent the substance contained therein from spattering with the air when the body 2 is rapidly compressed. Furthermore, due to the provision of the opening 10, there is no vacuum produced within the space defined between the inner tube 5 and the outer tube 6. A further advantage to be realized through the present invention is that there is little or substantially no loss of odor and oxidation of the substance contained because of the provision of the polyvinyl alcohol film 13 and further that the substance is prevented from drying due to the deposition of the polyethylene films 14 on the film 13.

The details of the manner in which the side ends 12 of the sheet 11 are secured to form the cylindrical inner tube 5 will be described hereinafter with reference to FIGS. 5 through 7.

In FIG. 5A, the sheet 11 has its side ends overlapping each other, which are secured or fused by electric heating or any other suitable method. A small amount of suitable water-resistant material 17, such as polyethylene, that is in a molten condition is applied on the inner end surface 16a of the sheet 11 to prevent the end of the water-soluble polyvinyl alcohol film 13 from exposure to the substance to be contained in the inner tube 5. If desired, such as a water-resistant material 17 may also be applied on the outer end surface 16b of the sheet 11, as shown in FIG. 5B.

In FIG. 6, there is schematically shown a typical process of forming the sheet 11 of laminated films in a generally cylindrical shape. The sheet 11 is supplied from a feed roll 18 to a tubing apparatus 20 by way of a guide roller 19. The tubing apparatus 20 comprises a cylindrical rod 21 of a diameter slightly smaller than the internal diameter of the inner tube 5, which rod is held in a generally horizontal position. A U-shaped guide member 22 is provided adjacent the fore end of the cylindrical rod 21 so as to form the sheet 11 in a channel shape in cooperation with the cylindrical rod 21. Provided adjacent the U-shaped guide member 22 downstream thereof is a nozzle 23 from which is discharged the water-resistant material 17 which is held molten. As seen in FIG. 7, the nozzle 23 is positioned so that its orifice is held at a point immediately above one end surface 16 of the channel-like sheet 11 in order to apply the material 17 thereonto. If desired, the nozzle 23 may be carried by a mechanism for horizontally moving the nozzle 23 to a position in which to apply the material 17 onto the other end surface 16 of the sheet 11, as is represented by the phantom line of FIG. 7.

An electric heating device 24 is provided downstream of the nozzle 23 to heat the overlapping portions 12 of the sheet 11 for fusion. The tube thus formed is pressed by a roller 25 which acts to apply a pressure onto the overlapping portions 12, and then is cooled by a cooling roller 26. The tube is further guided between a pair of transfer rollers 27 by which the speed of the tube in the tubing apparatus 20 is regulated. Although not shown, the tube is thereafter cut into segments of a predetermined length by a suitable device.

From the foregoing, it will be apparent that the present invention provides an improved collapsable tube of a double-walled construction comprising an inner tube and an outer tube, the inner tube being highly resistant to oil and water and having an extremely low permeability to oxygen gas, water vapor and odor, and the outer tube being sufficiently elastic to be able to return to its original shape after having been compressed. Additionally, it will be apparent that the present invention provides an improved collapsable tube of a double-walled construction in which the inner tube is constructed of a sheet consisting of a polyvinyl alcohol film and two polyethylene films deposited coextensively on both surfaces thereof. Furthermore, it will be apparent that the present invention provides an improved collapsable tube of a double-walled construction in which the inner tube is formed in a generally cylindrical shape by bending a sheet of laminated films with the side ends thereof overlapping each other and simultaneously applying on the end surface of the sheet a small amount of a suitable synthetic resin material that is fusible and water resistant.

From the foregoing, it can be readily realized that this invention can assume various embodiments. Thus, it is to be understood that the invention is not limited to the specific embodiments described herein, but is to be limited only by the appended claims.

What is claimed is:

1. A process for fabricating a double-walled collapsable tube, comprising:
    forming a shoulder member having a lower peripheral face, an annular connecting portion extending downwardly from the inner edge of said face, a circumferential edge adjacent to and above said peripheral face, and a neck on an upper portion of said shoulder member and adapted to receive a closure member;
    joining an end of a flexible inner tube to said shoulder member with said end abutting said lower peripheral face and with the inside surface of said inner tube adjacent said end mating against the outside surface of said annular connecting portion; and
    joining an end of a resilient outer tube to said shoulder member with the inside surface of said end abutting said circumferential edge of said shoulder member, said outer tube encompassing said inner tube and overlapping the joint between said inner tube and said shoulder member.

2. The process as claimed in claim 1, wherein said outer tube comprises a seamless tube of synthetic resin material.

3. The process as claimed in claim 1, wherein said inner tube is a laminated lap-welded tube formed of a plurality of films of different natured materials making said tube resistant to oil and water, and of low permeability to oxygen, water vapor and odor.

4. The process as claimed in claim 3, wherein said films comprise a polyvinyl alcohol film and two polyethylene films deposited on both surfaces of said polyvinyl alcohol film.

5. The process as claimed in claim 3, wherein said films comprise an aluminium foil and two polyethylene films deposited on both surfaces of said foil.

6. The process as claimed in claim 1, including closing the ends of said inner tube and said outer tube opposite said shoulder member.

7. The process as claimed in claim 3, wherein said laminated lap-welded tube is formed by:
    providing a laminated strip of at least two-different natured materials;
    depositing a separate molten material on at least one longitudinal edge of said laminated strip;
    overlapping the longitudinal edges of said strip to form a tube with said one edge positioned inside said tube; and
    heat fusing the overlapped surfaces of said strip.

8. A process for forming a multi-ply inner tube for use in a double-walled collapsable tube comprising:
    providing a laminated strip of at least two different natured materials;
    depositing a separate molten material on at least one longitudinal edge of said laminated strip;
    overlapping the longitudinal edges of said strip to form a tube with said one edge positioned inside said tube; and
    heat fusing the overlapped surfaces of said strip.

9. The process as claimed in claim 8, wherein said molten material is deposited on both longitudinal edges of said strip.

10. The process as claimed in claim 8, wherein said providing a laminated strip comprises:
    depositing two polyethylene films on both surfaces of a polyvinyl alcohol film.

11. The process as claimed in claim 8, wherein said providing a laminated strip comprises:
    depositing two polyethylene films on both surfaces of an aluminium foil.

* * * * *